United States Patent [19]
Benton

[11] 4,445,749
[45] May 1, 1984

[54] HOLOGRAPHIC PRODUCTS AND PROCESSES

[75] Inventor: Stephen A. Benton, Somerville, Mass.

[73] Assignee: Polaroid Corporation, Cambridge, Mass.

[21] Appl. No.: 157,187

[22] Filed: Jun. 6, 1980

[51] Int. Cl.³ .............................................. G03H 1/26
[52] U.S. Cl. .................................. 350/376; 350/3.69; 350/320
[58] Field of Search .................... 350/3.76, 3.69, 3.79, 350/320

[56] References Cited
U.S. PATENT DOCUMENTS
4,067,638 1/1978 Yano et al. ........................ 350/3.76

Primary Examiner—Bruce Y. Arnold
Attorney, Agent, or Firm—Edward S. Roman

[57] ABSTRACT

A method of making achromatic holographic stereograms in which projected images from a sequence of two-dimensional transparencies of a scene taken from a sequence of successively displaced positions are sequentially holographically recorded on adjacent strips of a photographic plate while the plate is inclined at an acute angle to the optical axis of projection of the images. The sequence of holographic strip images so recorded are re-recorded on a second hologram using a beam conjugate to the original reference beam to illuminate the strip hologram. The second holographic recording is done with the aid of a vertically inclined collimated reference beam of coherent light. Upon illumination of the second hologram with white light, a three-dimensional image of the original scene may be viewed by an appropriately placed observer which is achromatic over an extended angle of view and an extended apparent scene depth.

8 Claims, 19 Drawing Figures

HOLOGRAPHIC PRODUCTS AND PROCESSES

This invention relates to holography, and particularly to a novel method for producing achromatic or polychromic images from a series of two-dimensional photographs.

Various methods of making holographic stereograms from two-dimensional photographic images are known. In an article by D. J. DeBitetto entitled *Holographic Panoramic Stereograms Synthesized from White Light Recordings,* appearing on pages 1740 and 1741 of Applied Optics, Volume 8, No. 8, August, 1969, such a method is described, beginning with the step of recording a series of two-dimensional photographs of a three-dimensional subject taken from a series of equally spaced positions along a horizontal line. Images from these photographs are subsequently projected on a translucent screen. As each of the series of images is projected, it is holographically recorded on a region of a stationary photographic plate exposed by a horizontally movable vertical slit aperture, such that the images are recorded as a sequence of vertical strips on the photographic plate. Upon illumination of the strip hologram so produced with monochromatic light, a three-dimensional image is produced that has horizontal parallax but not vertical parallax. In an article entitled *A New Approach to Computer Generated Holography,* by King, Noll and Berry, published in Applied Optics, at pages 471–475, Vol. 9, No. 2, February, 1970, a method of producing holographic stereograms is described that is based on a sequence of images generated by a computer. The computer simulates the sequential photographing of an object as it is rotated about a vertical axis. The method described comprises the preparation of a strip hologram, as described by DeBitetto, and then holographically recording the strip hologram to form a second composite hologram.

The object of this invention is to provide a holographic stereogram viewable by white light to produce either an achromatic or a polychromatic three-dimensional image.

Briefly, the above and other objects of the invention are attained by a process that begins with the preparation of a series of photographic transparencies taken from a sequence of positions preferably displaced along a horizontal line in a plane normal to the common plane of focus of all of the images. This practice is to be distinguished from the practice of taking such a sequence of photographs with the camera optical axis intersecting a common point in object space in each of the several displaced camera positions. In accordance with this invention, the optical axis of the camera is kept parallel to a reference optical axis throughout the sequence of photographs, and distortions characteristic of the other approach are avoided.

The photographic transparencies so prepared are next sequentially projected, and the projected images holographically recorded, on a series of adjacent strip regions of a photographic plate, through a mask formed with an elongated strip aperture. In accordance with the invention, the aperture mask, and the plate behind it, are disposed at an acute angle to an optical axis normal to the plane of the projected images. These holographic exposures are made with a collimated reference beam.

After processing of the first hologram, a second hologram is made of the image projected by the first hologram when illuminated with a collimated illumination beam conjugate to the reference beam used in making the first hologram. The second hologram is exposed using a collimated reference beam inclined at an angle of 45° to 60° to the vertical, but not inclined to the horizontal. The second hologram, when processed, can be illuminated by white light to produce a fully achromatic three-dimensional image over an extended depth and field of view. By the use of filters in a manner to be described in more detail below, during recording and viewing of the second holographic image, a hologram illuminable by white light to produce a full color three-dimensional image can be produced.

The mode of practicing the invention will best be understood in the light of the following description, together with the accompanying drawings illustrative of various practices in accordance with the invention.

In the description which follows, various positional relationships will be described with reference to a set of three mutually orthogonal coordinate axes x, y and z shown in FIG. 1. In the usual case of interest, the z axis will be vertical and the x and y axes horizontal. However, it will be apparent as the description proceeds that the essential geometrical relationships between elements and objects to be described are invariant with respect to the choice of coordinates or the magnitude or direction of a gravitational field.

Figure 1:
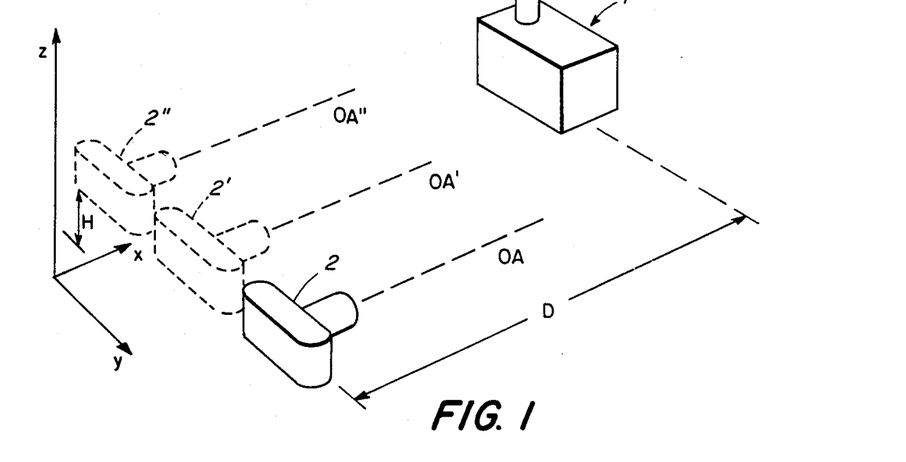
FIG. 1 is a schematic perspective sketch illustrating the preparation of a series of photographs in accordance with the invention.
Figure 2:
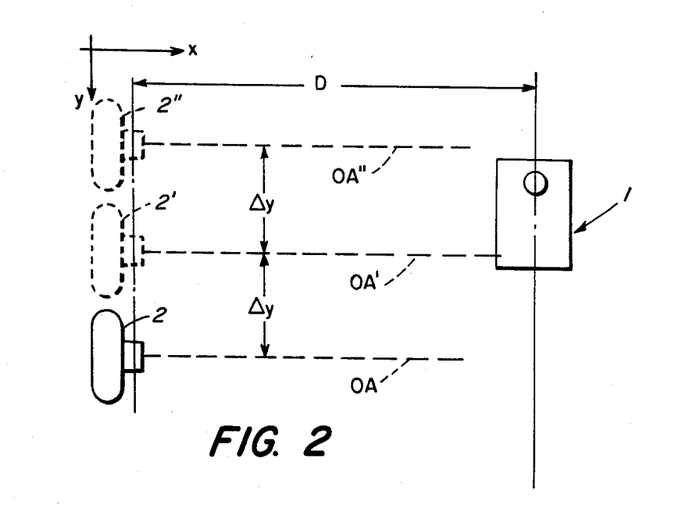
FIG. 2 is a plan view of the sketch of FIG. 1.

FIGS. 1 and 2 depict the preparation of a series of photographs of a scene comprising an object 1 with the aid of a camera diagrammatically illustrated at 2 and having an optical axis directed along the x axis, and a focal plane parallel to the yz plane. The camera 2 is located at a nominal distance D along the x axis from the subject 1. The subject 1 may be assumed to rest upon the xy plane and the camera 2 to be located a height H above the xy plane. The camera 2 is used to make a sequence of photographs at a number of locations, such as the location shown in full lines, and in other locations such as 2' and 2" each successively displaced from the next in the sequence along a line parallel to the y axis and each spaced from the next by a short fixed distance $\Delta 7$. The optical axis of the camera, as at OA, OA', OA", is parallel to the x axis in each of the series of positions of the camera.

Figure 3A:
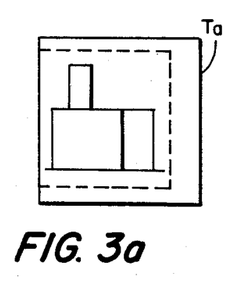
FIGS. 3a, 3b, and 3c are diagrammatic sketches of transparencies made from photographs taken in the manner shown in FIGS. 1 and 2.
Figure 3B:
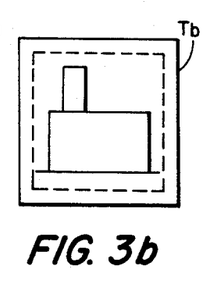
Figure 3C:
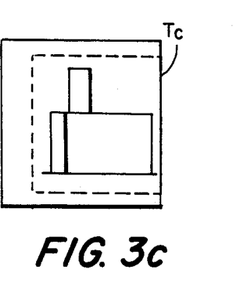

FIGS. 3a, 3b and 3c show transparencies Ta, Tb and Tc, respectively, made from photographs taken in the manner shown in FIGS. 1 and 2, with the camera in locations 2, 2' and 2" respectively. As indicated, the subject moves from left to right in the recorded image as the camera moves to positions to the left as seen in FIG. 1. By keeping the focal plane of the camera in the same plane parallel to the yz plane and the camera at the same height H above the xy plane, the vertical position of the subject, and its height, remain the same in the several transparencies. If the camera were to be redirected to a common point in object space for each exposure, both keystoning in the image and changes in subject size would occur from exposure to exposure.

For more efficient use of the image area in the holographic processes to be described, the portions of the several transparencies such as Ta, Tb and Tc indicated within the dotted lines, representing similar framing in the several views, may be cropped or copied. A similar result may be obtained by the use of a camera with a sliding back to make the successive photographs, so that the same framing may be preserved in the several views. However, the process indicated in FIGS. 1–3 is preferred because of the considerable simplification in procedure involved in merely moving the camera in a straight line, without adjustments, between photographs.

The number of photographs to be taken, and the spacing $\Delta y$ between camera positions in taking the photographs, are determined by the camera aperture and the total distance the camera is to be moved along the y axis from the first to the last exposure. The spacing between photographs should be not less than the camera's aperture, and the camera's aperture should be as small as possible consistent with the exigencies of the camera and the scene to be photographed. As an example, if the distance D is 50 cm and the total translation of the camera along the y axis is 30 cm, then the spacing $\Delta y$ between adjacent camera positions might be from 1 to 4 mm, so that a sequence of from 300 to 75 photographs would be taken; e.g., if the spacing was 2 mm, 150 photographs would be required.

Figure 5:
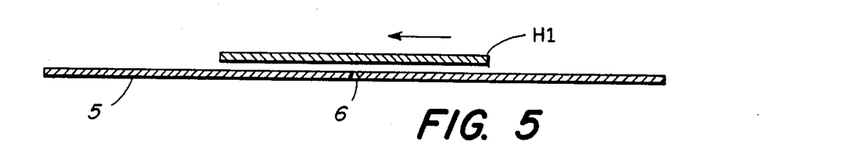
FIG. 5 is a cross-sectional view of a portion of the apparatus of FIG. 4, on an enlarged scale, taken as seen essentially along the lines 5—5 in FIG. 4.
Figure 6:
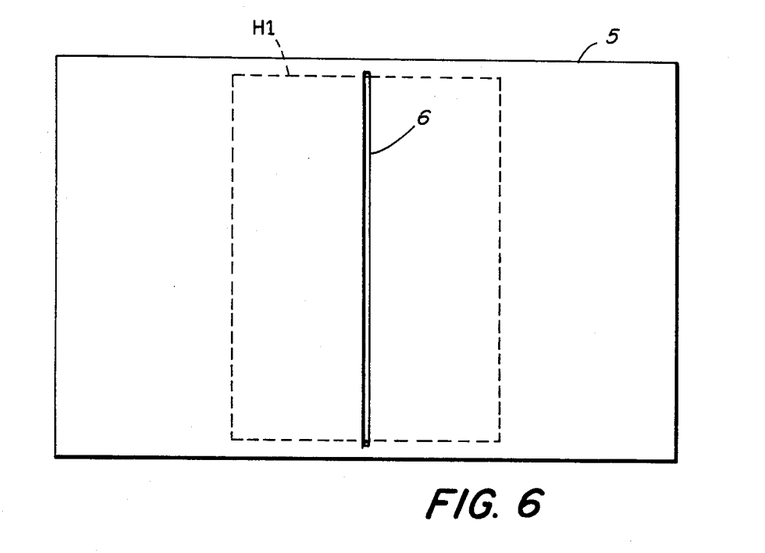
FIG. 6 is a sketch of a portion of the apparatus of FIG. 4, as seen essentially along the lines 6—6 in FIG. 4.

The transparencies Ti, such as the transparencies Ta, Tb and Tc shown in FIGS. 3a, 3b and 3c, or those portions selected to preserve similar framing as shown within the dotted lines in FIGS. 3a–3c, are sequentially projected and holographically recorded in the manner next to be described. Referring to FIGS. 4, 5, 6 and 7, a strip hologram H1 is made on a photographic plate on which there is a thin photographic emulsion. The emulsion is preferably capable of high resolution; for example, of 1000 lines per millimeter. The photographic plate is placed behind a mask 5 in which there is an elongated slit aperture 6 (FIGS. 5 and 6). The width of the aperture 6 is preferably equal to the spacing distance $\Delta y$ for orthostereoscopic imaging where H1 is made at the same distance D as used in making the photographs.

Figure 4:
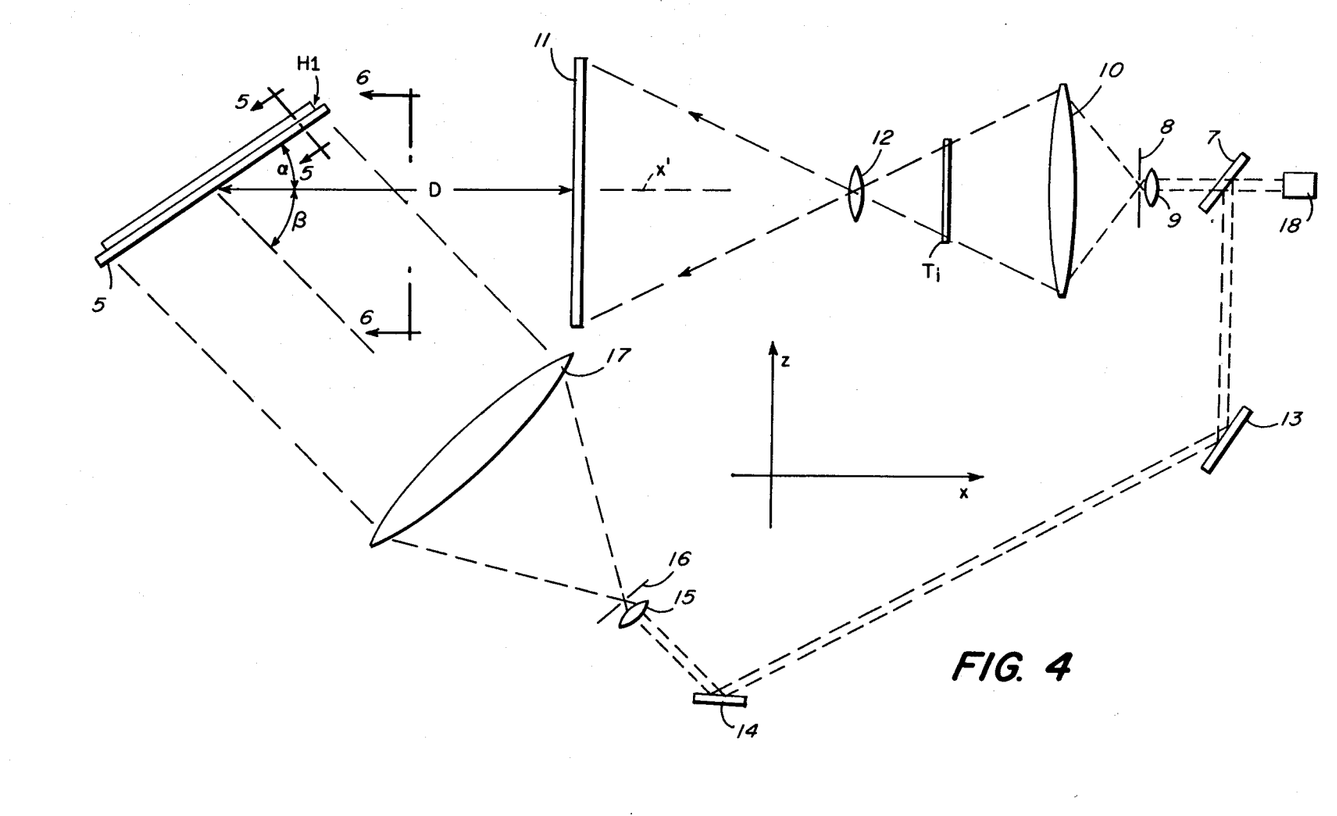
FIG. 4 is a schematic diagram illustrating the preparation of a first hologram in accordance with the invention.

The strip hologram H1 is made with the aid of a coherent light source such as a laser 18 (FIG. 4). The wavelength of the laser 18 is preferably selected to be as near as convenient to the center of the visible frequency spectrum. The exact frequency is not critical, and good results have been obtained with the aid of a laser operating at 514 nm, somewhat toward the blue in the green spectrum.

A collimated beam from the laser 18 is directed onto a beam splitter 7, the transmitted beam from which is focused onto a pinhole in a mask 8 by a lens 9, to form an essentially point source of light. Light from this source is focused by a lens 10 onto one of the transparencies Ti. The image on the transparency is focused onto a diffusion screen 11 by a lens 12.

A reference beam is reflected from the beam splitter 7 to a mirror 13, and thence to a mirror 14 that serves to direct the beam towards the hologram H1. The beam reflected from the mirror 14 is focused by a lens 15 onto an aperture in a mask 16 to form a reference beam for illuminating the hologram H1 with light coherent with that from the diffusion screen 11.

The reference beam from the aperture in the mask 16 is collimated by a lens 17 placed between the mask 16 and the hologram plate H1. The lenses 15 and 17 are preferably cylindrical, and the aperture in the mask 16 is preferably a narrow elongated slit, to concentrate the reference beam on the aperture 6.

As indicated, the laser 18 and the lenses 9 and 12 are aligned on an optical axis x' parallel to the x axis. The diffusion screen 11 is in a plane parallel to the yz plane. For the production of images the same size as the original subject, the center of the plate 4 on which the strip hologram H1 is to be made is at the distance D from the screen 11 which was the subject distance in the photographs taken as described in connection with FIGS. 1–3.

The mask 5 and the holographic plate H1 are inclined to the optical axis x' by an angle $\alpha$, which is chosen in the range of 35° to 41° based on considerations to be discussed below. The collimated reference beam from the lens 17 is inclined to the optical axis x' by an angle $\beta$. The angle $\beta$ is not critical. The significant constraint is that the rays of the collimated beam from the lens 17 should be parallel to the xz plane. The particular angle shown is for convenience in fitting the drawing on the page; and indeed, a similar choice might be made for convenience in adapting the holographic recording process to the artisan's particular optical bench. A presently preferred value for optimum diffraction efficiency is $\beta = 110°$.

Figure 7:
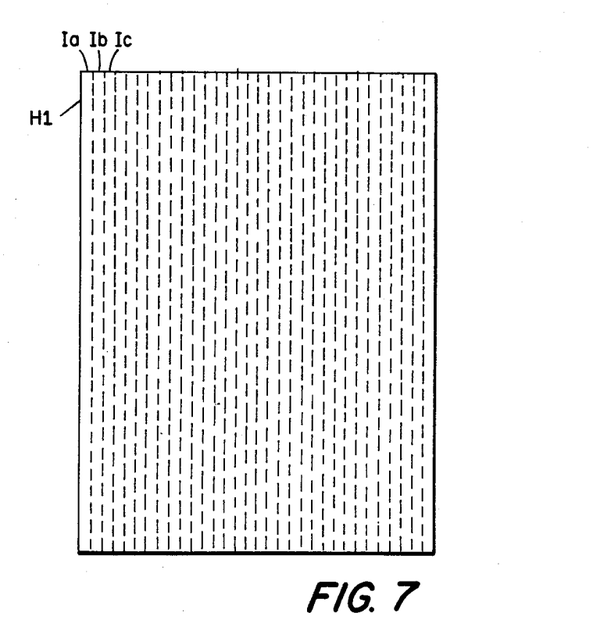
FIG. 7 is a diagrammatic sketch of the first hologram prepared in accordance with the process of FIGS. 1–6, on an enlarged scale relative to FIGS. 5 and 6, illustrating diagrammatically the location of various zones on the hologram.

The hologram H1 is made by projecting the first transparency, such as Ta in FIG. 3a, onto the screen 11 with the photographic plate positioned to the right of the position shown in FIG. 6 such that the left edge is exposed through the aperture 6 to record a holographic image Ia of the first transparency Ta as indicated in FIG. 7. The laser 18 is then deenergized while the first transparency is replaced by the second, such as Tb, and the photographic plate on which the hologram H1 is being recorded is moved to the left as seen in FIG. 6 to expose the region on which the next image Ib of the transparency Tb is recorded. This process is continued until adjacent latent strip holographic images of all of the transparencies have been recorded. The photographic plate is then processed in a conventional manner, preferably by developing, fixing and bleaching to form a final image that is modulated imagewise in index of refraction, by means of the imagewise concentration gradient of silver halide resulting from the bleaching process.

For greater efficiency, the diffusion screen 11 may be replaced by a lens designed to focus light from the lens 12 onto the center of the slit aperture 6, and a diffuser, such as a lenticular screen, that will spread the focus to fill the entire slit. A presently preferred practice will be described below with reference to FIGS. 15–17.

Figure 8:
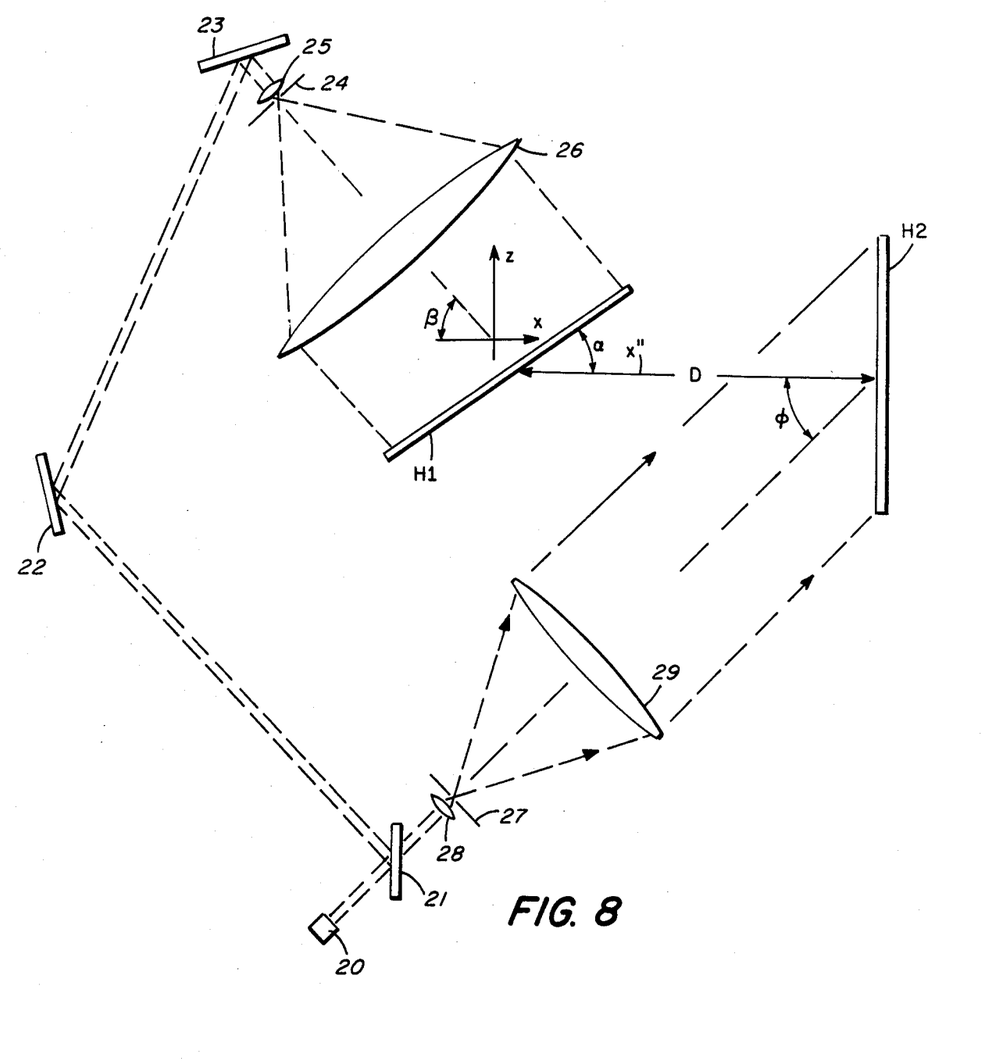
FIG. 8 is a schematic diagram illustrating the preparation of a second hologram in accordance with the invention.

Having processed the hologram H1, it may be used to make a second hologram H2 in the manner illustrated in FIG. 8. As there shown, the photographic plate on which the hologram H2 is to be recorded is placed at the distance D from the center of the hologram H1 along an optical axis x″ parallel to the x axis. The hologram H1 is inclined to the optical axis x″ by the same angle $\alpha$ as in the recording process described in connection with FIGS. 5–7.

The hologram H1 is illuminated by a collimated beam of coherent monochromatic light conjugate to the reference beam used in making the hologram H1, and thus inclined to the x axis by the angle $\beta$ as shown in FIG. 8 and oppositely directed to the reference beam from the lens 17 in FIG. 4 relative to the hologram H1.

The photographic plate on which the hologram H2 is to be made receives light diffracted by the hologram H1, and also receives light from a collimated reference beam having rays parallel to the xz plane and at an angle of incidence $\phi$. The angle $\phi$ may be from 45° to 60°. The angles $\phi$ and $\alpha$ are related approximately by $\alpha = \tan^{-1} \sin \phi$; thus, if $\phi = 45°$, $\alpha = 35°$, and for $\phi = 60°$, $\alpha = 41°$.

The illumination beam for the hologram H1 is provided by a laser 20 in FIG. 8 operating at the same wavelength as the laser 18 in FIG. 4. A portion of the beam from the laser 20 is reflected by a beam splitter 21 to mirrors 22 and 23 which redirect the beam into alignment with an axis intersecting the center of the hologram H1, parallel to the xz plane, and inclined to the x axis by the angle $\beta$. The beam is focused on a pinhole in a mask 24 by a lens 25, and collimated by a lens 26.

The reference beam for recording the hologram H2 is formed by a portion of the beam from the laser 20 passing through the beam splitter 21, focused onto a pinhole in a mask 27 by a lens 28, and collimated by a lens 29. The rays in the collimated beam from the lens 29 are parallel to the xz plane and incident on the photographic plate on which the hologram H2 is recorded at the angle $\phi$.

The hologram H2 is completed after exposure by processing in the manner described above for the hologram H1.

Figure 9:
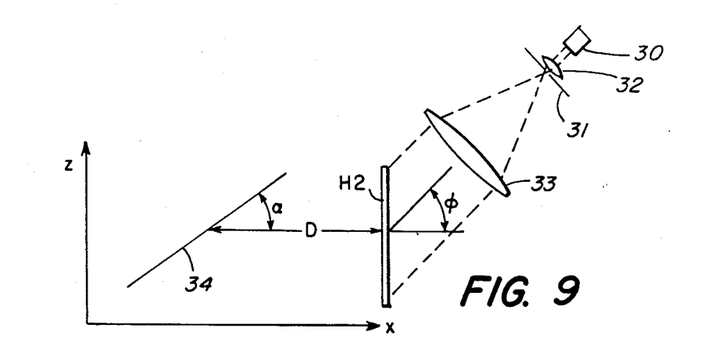
FIG. 9 is a diagrammatic elevational sketch illustrating the image formed by the illumination with monochromatic light of the second hologram formed in accordance with the process illustrated in FIG. 8.

FIG. 9 illustrates the illumination of the processed hologram H2 by a beam of collimated monochromatic light conjugate to the reference beam used in recording the hologram H2 in the manner described above. The illuminating beam is produced by a laser 30 operating at the same wavelength as the lasers 18 and 20 described above. The beam from the laser 30 is focused on a pinhole in a mask 31 by a lens 32, and collimated by a lens 33 to form a beam at the angle $\phi$ to the x axis and parallel to the xz plane.

Figure 10:
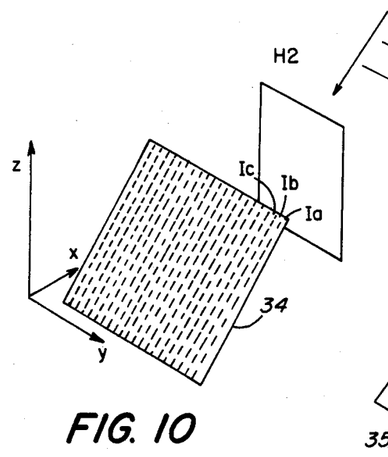
FIG. 10 is a schematic perspective sketch of pertinent portions of the arrangement of FIG. 9.

A real image 34 of the hologram H1 is formed at a central distance D along the x axis from the hologram H2, and inclined to the x axis of the angle $\alpha$. As best shown in FIG. 10, which is a perspective view of the pertinent portion of the arrangement of FIG. 9, the image 34 comprises vertically inclined strip zones through each of which an observer looking toward the hologram H2 can see an image of the subject 1 in FIGS. 1 and 2 from the point of view of the transparency from which the strip hologram in that zone was recorded. Thus, an observer successively looking through the image zones Ia, Ib and Ic would see images corresponding to those shown in FIGS. 3a, 3b and 3c, respectively. An observer looking through the image 34 with both eyes would perceive a three-dimensional image of the subject 1.

Figure 11:
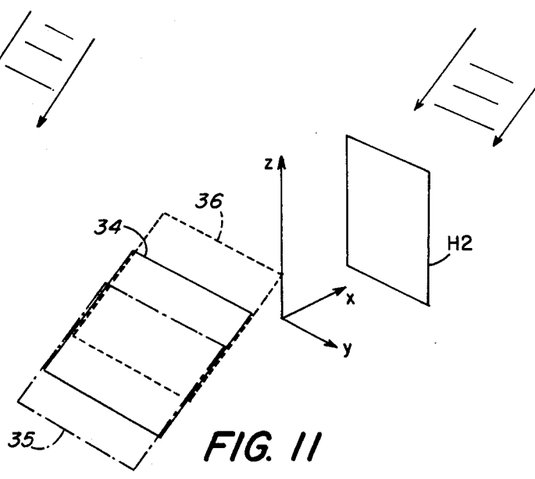
FIG. 11 is a schematic perspective sketch corresponding to FIG. 10 illustrating the illumination of the hologram formed in accordance with the process illustrated in FIG. 8 when illuminated with light having three wavelength components.

FIG. 11 is a view corresponding to FIGS. 9 and 10 but illustrating the illumination of the hologram H2 with a beam of collimated light containing three wavelength components in the red, green and blue. Three image zones 34, 35 and 36 are produced. The image 34 corresponds to the same image, assumed to be in the green, formed by monochromatic illumination as discussed in FIGS. 9 and 10; the separation of the image into vertical strip zones is not shown in FIG. 11 to avoid confusion in the drawing. The image zone 36 is a field of vertically inclined strip images through which images of the subject 1 can be seen in the red, coplanar with the green image zone 34 but at a smaller central distance along the x axis from the yz plane, and at a greater height above the xy plane. Otherwise, the image zone 36 is the same as the image zone 34. Similarly, the image zone 35 is coplanar with the image zones 34 and 36. A three-dimensional image of the subject 1 in blue can be seen through the portion of the zone 35 that does not overlap the images 34 and 36.

An observer with eyes looking through the images 34, 35 and 36 in the region in which they overlap will see an achromatic three-dimensional image of the subject 1 without color fringing over an angle of view of up to +30° and a scene depth up to 50 cm. The hologram H1 must be long enough, in the vertical direction as seen in FIG. 7, to provide a useful zone in which the red, blue and green image viewing zones overlap to produce achromatic images. For example, with a distance D of 50 cm, a plate 42 cm long was employed with $\alpha = 35°$. The plate was 32 cm wide.

FIG. 11 shows images produced by light at three discrete wavelengths. If the hologram H2 was illuminated in the same way with white light containing a continuum of wavelengths, as with sunlight, a continuum of image zones such as 34, 35 and 36 would be produced, through which achromatic images could be viewed over a substantial region.

Figure 12:
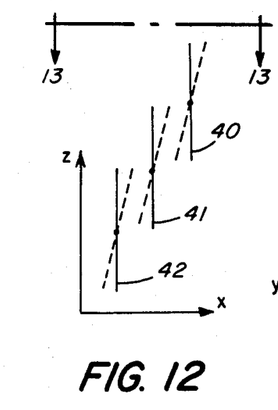
FIG. 12 is a diagrammatic sketch illustrating certain image formations useful in explaining the invention.
Figures 13, 14:
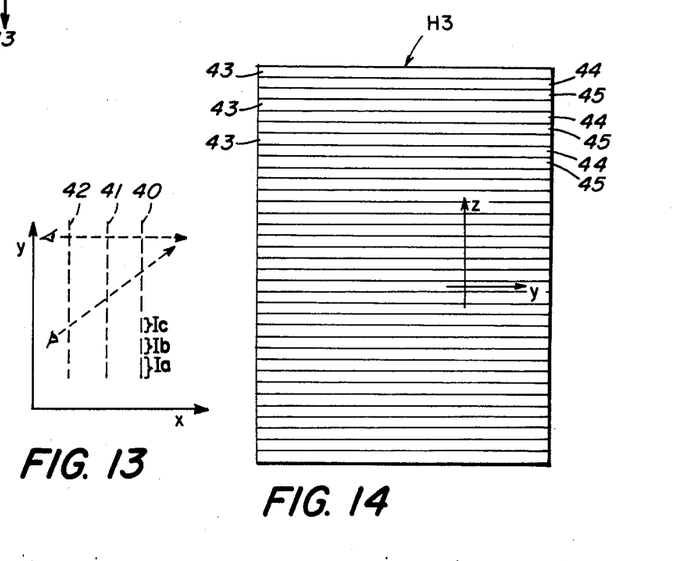
FIG. 13 is a diagrammatic plan sketch of the image arrangement shown in FIG. 12, as seen essentially along the lines 13—13 in FIG. 12.
FIG. 14 is an elevational sketch of a holographic plate adapted to produce full color images.

The fact that the image zones corresponding to different wavelengths are coplanar results from the choice of the angles $\alpha$ and $\phi$ in the manner described above. FIGS. 12 and 13 illustrate the effects of a different choice of $\alpha$ in making the hologram H1.

FIGS. 12 and 13 depict images 40, 41 and 42, as made by illuminating a hologram such as H2 in the manner shown in FIGS. 9–11 with light at three wavelengths, but assuming that the strip hologram corresponding to H1 had been made with $\alpha = 90°$ (H1 parallel to the diffusion screen 11 as in the conventional manner of making strip holographic stereograms). Assuming that the hologram being illuminated is to the right of the images in FIGS. 12 and 13, 40 would correspond to the red image, 41 to the green, and 42 to the blue. The image zones are at different heights above the xy plane, and at different distances from the yz plane, as before; this is a necessary consequence of the laws of diffraction. However, the image zones are now spaced and parallel.

With reference to FIG. 13, an observer looking along the x axis will see corresponding blue, green and red components of the same image corresponding to Ia, Ib or Ic, for example, although in somewhat different sizes. The image of the subject 1 would thus appear achromatic over a narrow angle of view. However, if viewed along an axis inclined to the x axis, components of more than one image would be seen. Thus, as shown, an observer looking through the images 42, 41 and 40 at an angle might see the subject of the image Ic in blue, the subject of the next adjacent image in green, and the subject of the next image in red. By making the image zones coplanar in the manner described in connection with FIGS. 1–11, this source of blur and color fringing in the image can be avoided.

Referring to FIG. 12, as the angle $\alpha$ used in making the hologram H1 is reduced from 90°, the images 40, 41 and 42 would be rotated about their centers, through positions shown in dotted lines in FIG. 12, until at the appropriate value of $\alpha$ the images would become coplanar as shown in FIG. 11.

The process of the invention can be modified to permit the production of a three-dimensional image in full color. For this purpose, a sequence of photographs may be taken as described in connection with FIGS. 1–3, above, using any desired conventional color positive transparency film.

From these transparencies, three strip holograms such as H1 would be made in the manner described above in connection with FIGS. 4–7, using green, red and blue light lasers. For clarity these holograms will be referred to as H1R, H1G, and H1B, for the holograms made with red light, green light, and blue light, respectively.

Next, a hologram H3 would be made on a photographic plate diagrammatically shown in FIG. 14. The photographic plate is overlaid with repetitive triplets of red, green and blue filters, such as red filter strips 43, green filter strips 44, and blue filter strips 45. These strips are arranged on the plate parallel to the direction in which the finished image will exhibit parallax; i.e., normal to the direction of elongation of the strip image zones such as Ia, Ib and Ic in FIG. 10. The filter strips may be provided in various ways, but are preferably made by the process described and claimed in U.S. Pat. No. 3,284,208.

The hologram H3 is made by exposing the plate covered with filter strips as just described in three steps each of the kind described above in connection with FIG. 8. The plate on which H3 is made is placed in the position of the hologram plate H2 in FIG. 8 with the filter strips oriented relative to the yz axis as shown in FIG. 14. Three holographic exposures are made, each with a different one of the three strip holograms H1G, H1R and H1B made as described above in the position of the hologram H1 in FIG. 8. For the exposure of H3 to H1G, the laser 20 may be employed. For the exposure of H3 to H1R, a red laser would replace the green laser 20, and for the exposure of H3 to H1B, a blue laser would be used.

After exposure of H3 in the manner described above, and processing without displacement of the filter stripes 43, 44 and 45, the hologram H3 may be illuminated with white light to produce a continuum of image zones through which a full color image of the subject can be viewed.

The use of repetitive strips of color filters has previously been proposed for making holographic images in color. However, this has not previously proven to be acceptable, because the filter strips, when thin enough to be visually innocuous, produce disruptive diffraction effects. However, when aligned and used as herein described, the images are quite acceptable because of the inherent insensitivity of holograms having only horizontal parallax to vertical blurring.

The use of filter strips in the manner just described is not confined in its utility to the manufacture of holographic stereograms. The process can be used to advantage in the holographic recording and viewing of polychromatic images of any subject which exhibit parallax in one direction but not in another direction orthogonal to the first. For example, parallax limited holograms such as described in copending U.S. application Ser. No. 66,303, filed on Aug. 13, 1979 by Stephen A. Benton for Method and Apparatus for Making Achromatic Holograms and assigned to the assignee of this invention can be recorded and viewed in full color using filter strips in the manner here described. Parallax limited images produced by a slit aperture in combination with a lens, as described in U.S. Pat. No. 3,633,989 can also be recorded in full color in this manner.

The processes of recording holograms described above require well-collimated beams. However, the degree of collimation of the beams used to illuminate the holograms such as H2 and H3 for viewing is not particularly critical. For example, a point source at a distance of 6 meters could be employed.

A preferred composite holographic element for use in place of the diffusion screen 11 in FIG. 4 can be made in a manner next to be described with reference to FIGS. 15, 16 and 17.

Figure 15:
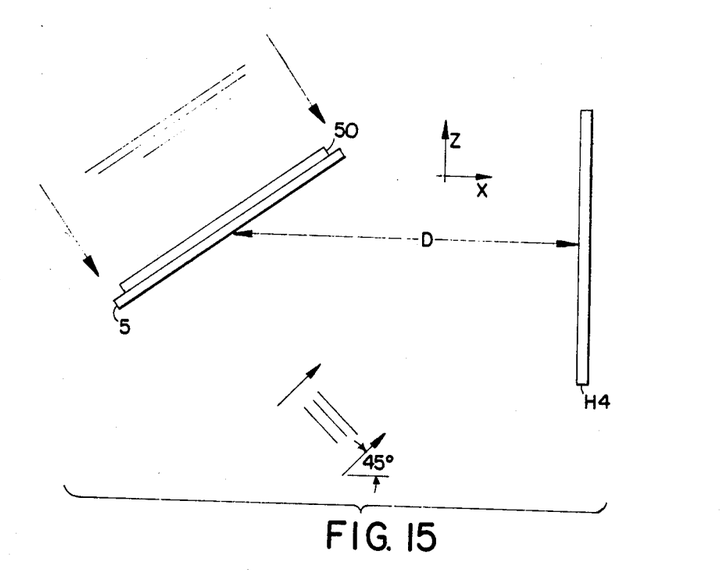
FIG. 15 is a diagrammatic sketch illustrating the preparation of a holographic diffuser useful in the practice of the invention.

Referring first to FIG. 15, a hologram comprising a holographic diffuser H4 may be made by a holographic exposure with the apertured mask 5. The photographic plate on which the hologram H4 is made is located relative to the mask 5 at the distance D from the center of the aperture 6 in the same position as the screen 11 in FIG. 4. The slit aperture in the mask 5 is illuminated from the rear through a ground glass diffuser plate 50 by a beam such as the conjugate of the illumination beam from the lens 17 in FIG. 4, using the preferred cylindrical form described above for the lenses such as 15 and 17 used to form the beam. The source must be a laser operating at the same wavelength as the laser 18 in FIG. 4. A collimated reference beam derived from the same source as used for the illumination beam is directed onto H4 at 45° to the z axis and parallel to the xz plane. After exposure, the hologram H4 is processed as described above.

Figure 16:
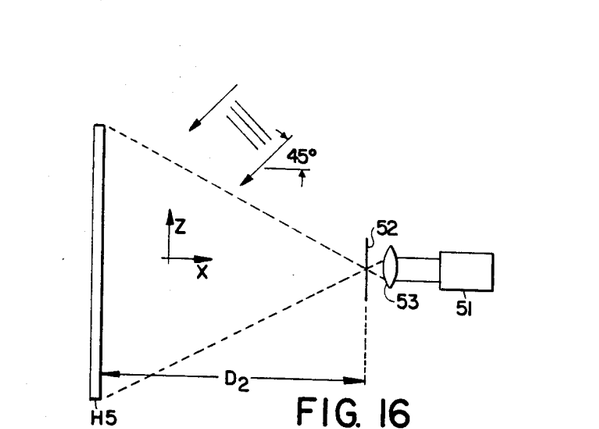
FIG. 16 is a diagrammatic sketch illustrating the preparation of a holographic collimator useful with the collimator of FIG. 15.

FIG. 16 illustrates the preparation of a hologram H5 comprising a holographic collimator. The hologram H5 is exposed with an illumination beam comprising a point source located at the distance D2 along the x axis in the same position relative to H5 as is the lens 12 in FIG. 4 relative to the screen 11. This source must be provided by a laser 51 operating at the same wavelength as the laser 18 in FIG. 4. The beam from the laser 51 is focused on a pinhole in a mask 52 by a lens 53. A collimated reference beam derived from the same source is directed onto H5 at an angle of 45° to the x axis and parallel to the xz plane. After exposure, the hologram H5 is processed as described above.

Figure 17:
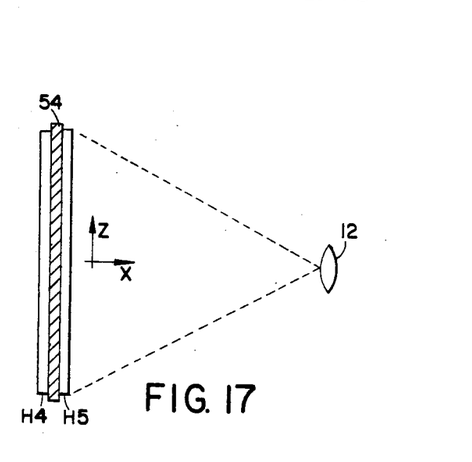
FIG. 17 is a diagrammatic sketch illustrating the use of a composite holographic element useful in the practice of the invention.

A composite holographic element comprising the holograms H4 and H5 is shown in FIG. 17. As shown, a louvered optical filter 54 is sandwiched between the hologram H4 and the hologram H5, and the sandwich is placed relative to the lens 12 in FIG. 4 in the same position as the diffusion screen 11, with H5 on the side confronting the lens 12 and H4 on the side confronting H1. The strip hologram such as H1 in FIG. 4 is then made in the same manner as described above in connection with FIGS. 4–7, except that the composite holographic element takes the place of the screen 11.

The louvered optical filter 54 may be of the type more fully described in U.S. Pat. No. 3,944,322. Its purpose is to pass only light rays inclined to the x axis at 45°.

The composite holographic element of FIG. 17 serves to fill the slit aperture 6 in the mask 5 of FIGS. 4–7 with light passing through the transparency being projected, greatly reducing the amount of wasted light that would otherwise fall on the mask 5 outside of the slit aperture. This greatly increases the optical efficiency of the holographic recording process as compared with the use of a diffusion screen.

In the operation of the composite element of FIG. 17, light from the lens 12, modulated by the image on the transparency being projected, falls on the hologram H5 and recreates the reference beam of FIG. 16, modulated by the image information, and travelling in the right direction to pass through the louvers in the optical filter 54. The beam through the optical filter 54 simulates the conjugate of the reference beam used to make the hologram H4 but modulated by image information. So illuminated, the hologram H4 recreates the conjugate of its object beam from the aperture 6, modulated imagewise, such that this modulated beam will fill the aperture 6 if appropriately located to make a hologram such as H1.

The angles of incidence of the reference beams in FIGS. 15 and 16 need not be 45°, so long as they are equal and the louvers of the optical filter 54 are correctly oriented to transmit light at the chosen angle of incidence. Composite elements such as that shown in FIG. 17 can be used to fill an aperture of essentially any shape and orientation so long as the chosen aperture and orientation are employed in making the hologram H4.

In making holograms such as H1 using either the composite holographic element, the diffusion screen 11, or the lens and lenticular screen, for the purposes of defining an essential constraint, and for clarity of exposition, the plane of projection of the several transparencies may be defined as that plane in which an image of the projected transparency is focused by the lens 12. For achromatic results, the plate on which the hologram H1 is made should be inclined at an angle between 35° and 41° to a normal to this plane, or, in other words, at an angle between 49° and 55° to the projection plane itself. As will be apparent from the above description, particularly with reference to FIGS. 12 and 13, the more nearly one approaches this angular range, the better achromatic images are approximated.

The various procedures described above have dealt with orthostereoscopic imaging, in which the same distance D is used for taking the photographs and for recording and viewing the holograms. As will be apparent to those skilled in the art, the distance at which the photographs are taken may be larger or smaller than the distance at which the holographic recordings are made and viewed, while the viewing distance will necessarily be the same as the holographic recording distances.

While the process of the invention has been described with respect to the details of various specific procedures and arrangements, many changes and variations will be apparent to the artisan upon reading this description, and such may be made without departing from the scope of the invention.

Having thus described the invention, what is claimed is:

1. A process for making an achromatic holographic stereogram, comprising the steps of: projecting a sequence of transparencies onto a predetermined projection plane; sequentially holographically recording each of the sequence of projected images on contiguous narrow elongated strips of a first photographic plate, said sequential holographic recording being made with a collimated reference beam, said photographic plate being inclined to a normal to said projection plane at an angle $\alpha$ of from 35° to 41°; illuminating the resulting hologram with a beam conjugate to said reference beam; and holographically recording the image produced by said illuminating beam onto a second photographic plate, said second photographic plate being in a position corresponding to the location of said projected images relative to said hologram, said second holographic recording being effected by using a second collimated reference beam to illuminate said second photographic plate at an angle of incidence $\phi$ related to the angle $\alpha$ at which said first recited plate is inclined to said normal by $\phi = \sin^{-1} \tan \alpha$.

2. A process for making an achromatic holographic stereogram comprising the steps of: taking a sequence of photographs of a scene with a camera, from a sequence of positions displaced one from the next by a fixed distance along a line parallel to the plane of focus of the camera, the optical axis of the camera being kept in the taking of each of said photographs parallel to its direction in the taking of the first of said photographs; making positive projection transparencies from said photographs; projecting said transparencies in the sequence in which said photographs were taken onto a predetermined projection plane; sequentially holographically recording each of the sequence of projected images on contiguous elongated strips of a first photographic plate, said sequential holographic recording being made with a collimated reference beam, said photographic plate being inclined to a normal to said projection plane at an angle $\alpha$ of from 35° to 41°; illuminating the resulting hologram with a beam conjugate to said reference beam; and holographically recording the image produced by said illuminating beam on a second photographic plate, said second photographic plate being in a position corresponding to the location of said projected images relative to said hologram, said second holographic recording being effected by using a second collimated reference beam to illuminate said second photographic plate at an angle of incidence $\phi$ related to the angle $\alpha$ at which said first recited plate is inclined to said normal by $\phi = \sin^{-1} \tan \alpha$.

3. A process for making a hologram capable of producing polychromatic images when illuminated with white light, said process comprising the steps of: making at least two holograms, each hologram exhibiting parallax along a first axis but not along a second axis orthogonal to said first axis, each hologram having been recorded with light of a different wavelength; sequentially illuminating each of said holograms with light of the wavelength with which it was recorded; and holographically recording the images produced by said illuminations by exposing a photographic plate to each of the images produced by said illuminations, said photographic plate being covered with repetitive elongated filter strips in sets, each set comprising one filter strip selectively transmissive of light of each said different wavelength, said strips being elongated in a direction parallel to the direction in which said images exhibit parallax.

4. A process for making a polychromatic holographic sterogram, comprising the steps of: making a sequence of positive color transparencies of a scene with a camera, said sequence of positive color transparencies being made by a series of exposures, each from positions displaced one from the next by a fixed distance along a line parallel to the plane of focus of the camera, the optical axis of the camera being kept, in the making of each of said series of exposures, parallel to its direction in the making of the first of said series of exposures; projecting said transparencies onto a predetermined projection plane, to provide a sequence of projected images; making a first strip hologram by sequentially holographically recording, with light of a first wavelength and with a collimated reference beam, each of said sequence of projected images, the sequential holographic recording being made on contiguous elongated strips of a first photographic plate, said first photographic plate being inclined to a normal to said projection plane at an angle of from 35° to 41°; making a second strip hologram by sequentially holographically recording, with light of a second wavelength and with a collimated reference beam, each of said sequence of projected images, the sequential holographic recording being made on contiguous elongated strips of a second photographic plate, said second photographic plate being inclined to a normal to said projection plane at an angle of from 35° to 41°; sequentially illuminating each of said strip holograms, each with light of the wavelength with which it was recorded; and holographically recording the images provided by said illuminated strip holograms on a photographic plate, said photographic plate being covered with repetitive elongated filter strips in sets, each set comprising one filter strip selectively transmissive of light of each said different wavelength, said strips being elongated in directions parallel to the directions in which images produced by said first and second strip holograms exhibit parallax.

5. A process for making a hologram, comprising the steps of: projecting a sequence of transparencies onto a predetermined projection plane; and sequentially holographically recording the sequence of projected images on contiguous narrow elongated strips of a photographic plate, the sequential holographic recording being made with a collimated reference beam, said photographic plate being inclined to a normal to said projection plane at an acute angle selected to produce a substantially achromatic image.

6. The process of claim 5 wherein said sequence of transparencies is prepared by photographing a scene with a camera from a sequence of positions displaced one from the next by a fixed distance along a line parallel to the plane of focus of the camera, the optical axis of the camera being kept, in the taking of each of the photographs, parallel to its direction in the taking of the first of said photographs.

7. A process for making a hologram from which a substantially achromatic image can be produced comprising the steps of: projecting a sequence of transparencies onto a predetermined projection plane; sequentially holographically recording the sequence of projected images on contiguous narrow elongated strips of a photographic plate, the sequential holographic recording being made with a collimated reference beam, said photographic plate being inclined to a normal to said projection plane at an acute angle $\alpha$ selected to produce a substantially achromatic image; and holographically recording an image produced by illuminating said sequential holographic recording with a beam conjugate to said reference beam on a second photographic plate in a position corresponding to the location of said projected images relative to said sequential holographic recording using a second collimated reference beam to illuminate said second photographic plate at an angle of incidence $\phi$ related to the angle $\alpha$ at which said first recited plate is inclined to said normal.

8. A process for making a hologram capable of producing polychromatic images when illuminated with white light, comprising the steps of: sequentially holographically recording, with light of at least two different wavelengths, an image that exhibits parallax in a first direction but not in a second direction normal to said first direction, said sequential holographic recording being made on a photographic plate covered with repetitive elongated filter strips in sets, each set comprising one filter strip selectively transmissive of light of each wavelength in which said image is recorded, said strips being elongated in the direction in which said recorded image exhibits parallax.

* * * * *